(12) United States Patent
Kuraishi et al.

(10) Patent No.: US 9,931,955 B2
(45) Date of Patent: Apr. 3, 2018

(54) MANAGEMENT SYSTEM AND MANAGEMENT METHOD OF BATTERY AND BATTERY CHARGER, AND BATTERY CHARGER

(71) Applicant: KABUSHIKI KAISHA TOYOTA JIDOSHOKKI, Aichi (JP)

(72) Inventors: Mamoru Kuraishi, Kariya (JP); Shinji Hirose, Kariya (JP); Kenji Nishigaki, Kariya (JP); Junichi Hatano, Kariya (JP)

(73) Assignee: KABUSHIKI KAISHA TOYOTA JIDOSHOKKI, Acihi-ken (JP)

( * ) Notice: Subject to any disclaimer, the term of this patent is extended or adjusted under 35 U.S.C. 154(b) by 179 days.

(21) Appl. No.: 14/894,765

(22) PCT Filed: Apr. 11, 2014

(86) PCT No.: PCT/JP2014/060517
§ 371 (c)(1),
(2) Date: Nov. 30, 2015

(87) PCT Pub. No.: WO2014/196270
PCT Pub. Date: Dec. 11, 2014

(65) Prior Publication Data
US 2016/0101705 A1    Apr. 14, 2016

(30) Foreign Application Priority Data
Jun. 7, 2013  (JP) ................................. 2013-120310

(51) Int. Cl.
*H02J 7/00*  (2006.01)
*B60L 11/18*  (2006.01)
(Continued)

(52) U.S. Cl.
CPC ............. *B60L 11/1838* (2013.01); *B60L 3/12* (2013.01); *B60L 11/1816* (2013.01);
(Continued)

(58) Field of Classification Search
CPC .................................................. B60L 11/1838
(Continued)

(56) References Cited

U.S. PATENT DOCUMENTS

| 5,548,200 A | 8/1996 | Nor et al. | |
|---|---|---|---|
| 8,258,748 B2* | 9/2012 | Constien | G01R 31/3679 320/127 |
| 2010/0211340 A1 | 8/2010 | Lowenthal et al. | |
| 2011/0078092 A1* | 3/2011 | Kim | B60L 11/1824 705/412 |
| 2011/0279083 A1* | 11/2011 | Asai | B60L 11/1816 320/109 |
| 2011/0298626 A1* | 12/2011 | Fechalos | H01M 10/482 340/664 |
| 2013/0119944 A1 | 5/2013 | Stineau | |
| 2013/0179061 A1* | 7/2013 | Gadh | B60L 11/1842 701/123 |

(Continued)

FOREIGN PATENT DOCUMENTS

| EP | 2 398 667 | 12/2011 |
|---|---|---|
| JP | 2005-139000 | 6/2005 |

(Continued)

OTHER PUBLICATIONS

Extended European Search Report for EP 14808097.1 dated Feb. 13, 2017.
(Continued)

*Primary Examiner* — Suresh Memula
(74) *Attorney, Agent, or Firm* — Greenblum & Bernstein, P.L.C.

(57) ABSTRACT

A management system and a management method of a battery and a battery charger, and a battery charger are provided that can obtain information on the state of a battery and information on the usage state of a battery charger even during charging so as to monitor/control the battery and the battery charger even during the charging.

10 Claims, 7 Drawing Sheets

(51) Int. Cl.
| | |
|---|---|
| *H02J 7/02* | (2016.01) |
| *H02J 5/00* | (2016.01) |
| *B66F 9/24* | (2006.01) |
| *H01M 10/44* | (2006.01) |
| *B60L 3/12* | (2006.01) |
| *H02J 13/00* | (2006.01) |
| *G06Q 10/06* | (2012.01) |
| *H01M 10/42* | (2006.01) |

(52) U.S. Cl.
CPC ....... *B60L 11/1824* (2013.01); *B60L 11/1861* (2013.01); *B66F 9/24* (2013.01); *G06Q 10/06* (2013.01); *H01M 10/44* (2013.01); *H02J 5/00* (2013.01); *H02J 7/0021* (2013.01); *H02J 7/02* (2013.01); *H02J 13/001* (2013.01); *B60L 2200/42* (2013.01); *B60L 2240/545* (2013.01); *B60L 2240/547* (2013.01); *B60L 2240/549* (2013.01); *B60L 2240/70* (2013.01); *B60L 2250/16* (2013.01); *H01M 2010/4278* (2013.01); *Y02P 90/60* (2015.11); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/14* (2013.01); *Y02T 90/16* (2013.01)

(58) Field of Classification Search
USPC ........................................................ 320/109
See application file for complete search history.

(56) References Cited

U.S. PATENT DOCUMENTS

| | | | |
|---|---|---|---|
| 2015/0372518 A1* | 12/2015 | Toya | ..................... G06F 3/0488 320/106 |
| 2016/0105044 A1* | 4/2016 | Yamaguchi | ........... H02J 7/0016 320/112 |

FOREIGN PATENT DOCUMENTS

| | | |
|---|---|---|
| JP | 2005-198445 | 7/2005 |
| JP | 2006-074868 | 3/2006 |
| JP | 2008-065635 | 3/2008 |
| JP | 2011-102739 | 5/2011 |
| JP | 2012-147633 | 8/2012 |
| JP | 2012-518386 | 8/2012 |
| JP | 2014-504420 | 2/2014 |

OTHER PUBLICATIONS

International Search Report for PCT/JP2014/060517 dated Jul. 15, 2014.
Japanese Office Action for counterpart JP App. No. 2014-113832 dated Jan. 23, 2018.

* cited by examiner

(a) OPERATION MANAGEMENT OF BATTERY CHARGER

| CHARGE ID | CHARGE STATE | BATTERY REMAINING POWER | POWER | CHARGING COMPLETION PERIOD | OPERABLE PERIOD | BATTERY CHARGER ABNORMAL/NORMAL |
|---|---|---|---|---|---|---|
| 1 | DURING CHARGING | 40% | 7kW | 40min | 2hr | NORMAL |
| 2 | COMPLETION | 80% | 0 | — | 4hr | NORMAL |
| 3 | DURING CHARGING | 20% | 14kW | 60min | 1hr | NORMAL |
| 4 | ABNORMAL HALT | — | — | — | — | ABNORMAL |

(b) CHARGING POWER MANAGEMENT OF BATTERY CHARGER

| BATTERY CHARGER ID | PRESENT | TODAY (PEAK) | YESTERDAY (PEAK) | THIS WEEK (PEAK) | LAST WEEK (PEAK) | THIS MONTH | LAST MONTH | YEAR |
|---|---|---|---|---|---|---|---|---|
| 1 | 3.5kW | 5kWh (4.1kW) | 6kWh (4.2kW) | 20kWh (4.1kW) | 30kWh (4.3kW) | 80kWh | 70kWh | 820kWh |
| 2 | | | | | | | | |

(c) REMOTE MONITORING OF BATTERY

| PACK ID | CHARGE STATE | CELL SOC (CURRENT VALUE) | CELL FULLY-CHARGED CAPACITY (CURRENT VALUE) | CELL INTERNAL RESISTANCE (CURRENT VALUE) | ACCUMULATED NUMBER OF TIMES OF DETECTION OF BLOCK OVERCHARGING | ... |
|---|---|---|---|---|---|---|
| AAAA | CHARGING | 52% | 40Ah | 2.25MΩ | 0 | |
| BBBB | CHARGING | 63% | 40Ah | 2.21MΩ | 0 | |
| CCCC | HALTED | 21% | 39Ah | 2.41MΩ | 0 | |
| DDDD | HALTED | 78% | 38Ah | 2.51MΩ | 1 | |

MANAGEMENT SYSTEM AND MANAGEMENT METHOD OF BATTERY AND BATTERY CHARGER, AND BATTERY CHARGER

FIELD

The present invention relates to a management system and a management method of a battery and a battery charger, and to a battery charger, and particularly to a management system, a management method and a battery charger that obtain information on the state of a battery mounted on a vehicle and information on a battery charger of the battery so as to manage the battery and the battery charger collectively.

BACKGROUND

Figure 5:
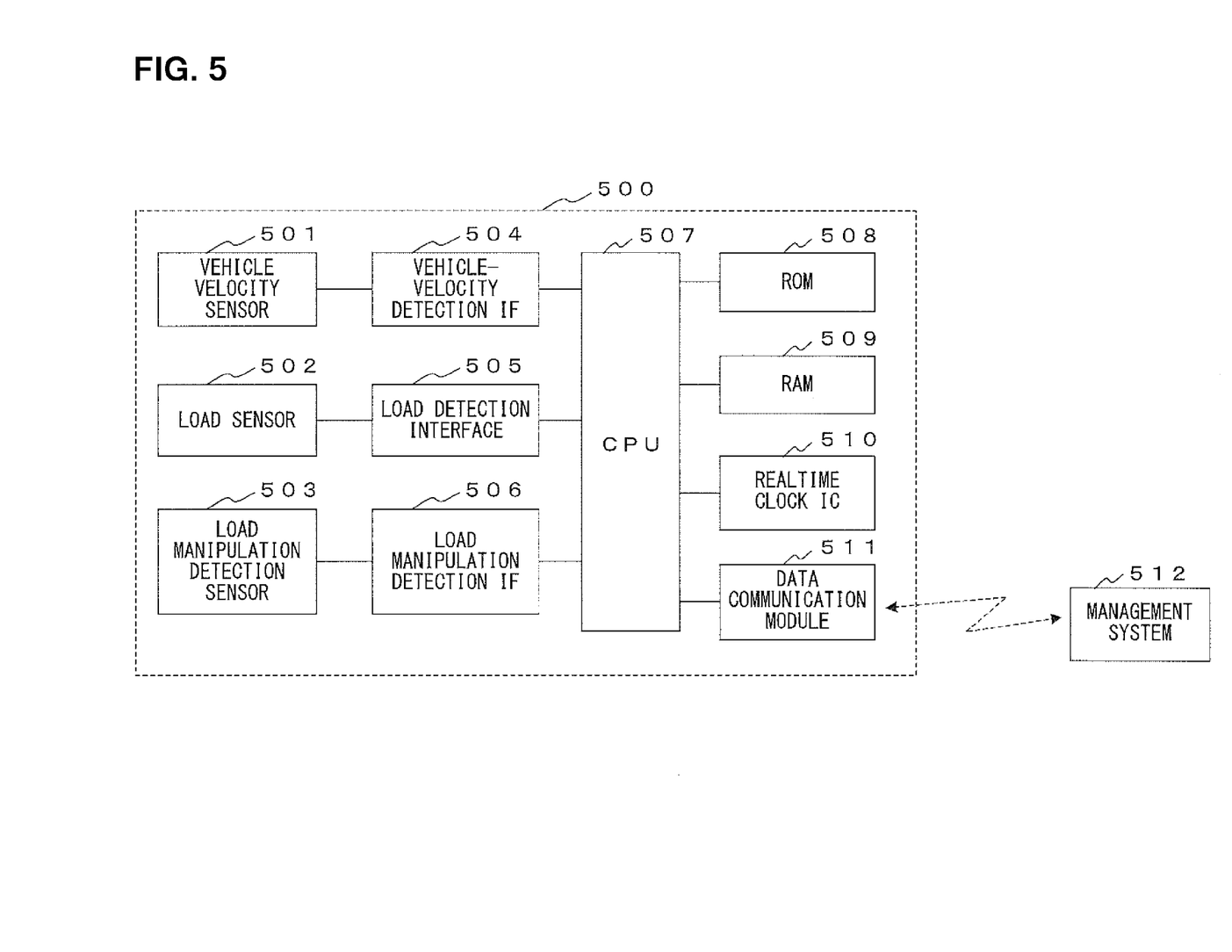
FIG. 5 shows an important portion of a management system for managing the operation state of an industrial vehicle.

A management system for managing the operation states of industrial vehicles such as a forklift etc. is disclosed by for example Patent Document 1 below etc. An important portion of the management system disclosed in Patent Document 1 is shown in FIG. 5. In FIG. 5, a vehicle 500 such as a forklift etc. includes a CPU 507, and the CPU 507 detects the operation state of the vehicle 500 at prescribed time intervals on the basis of output from a vehicle velocity sensor 501, a load sensor 502 and a load manipulation detection sensor 503.

Output from the vehicle velocity sensor 501, the load sensor 502 and the load manipulation detection sensor 503 are respectively converted by a vehicle-velocity detection interface 504, a load detection interface 505 and a load manipulation detection interface 506 into signals that the CPU 507 can recognize. Also, the CPU 507 executes a program stored in a ROM 508.

A RAM 509 is used as a work area for the CPU 507. A realtime clock IC 510 outputs information representing the time. A data communication module 511 transmits the result of detection conducted by the CPU 507 (i.e., data representing the operation state of the vehicle 500) to a management system 512. Communications between the data communication module 511 and the management system 512 may be wireless or wired.

Receiving data representing the operation state transmitted from the data communication module 511 of the vehicle 500, the management system 512 analyzes the data, determines the operation state (running with loads, running without loads, standing with loads and standing without loads) of the vehicle 500 for each time unit, generates data for recognizing, studying and managing the operation state of the vehicle 500 on the basis of the determination result, and displays the data in a display device (not shown).

Figure 6:
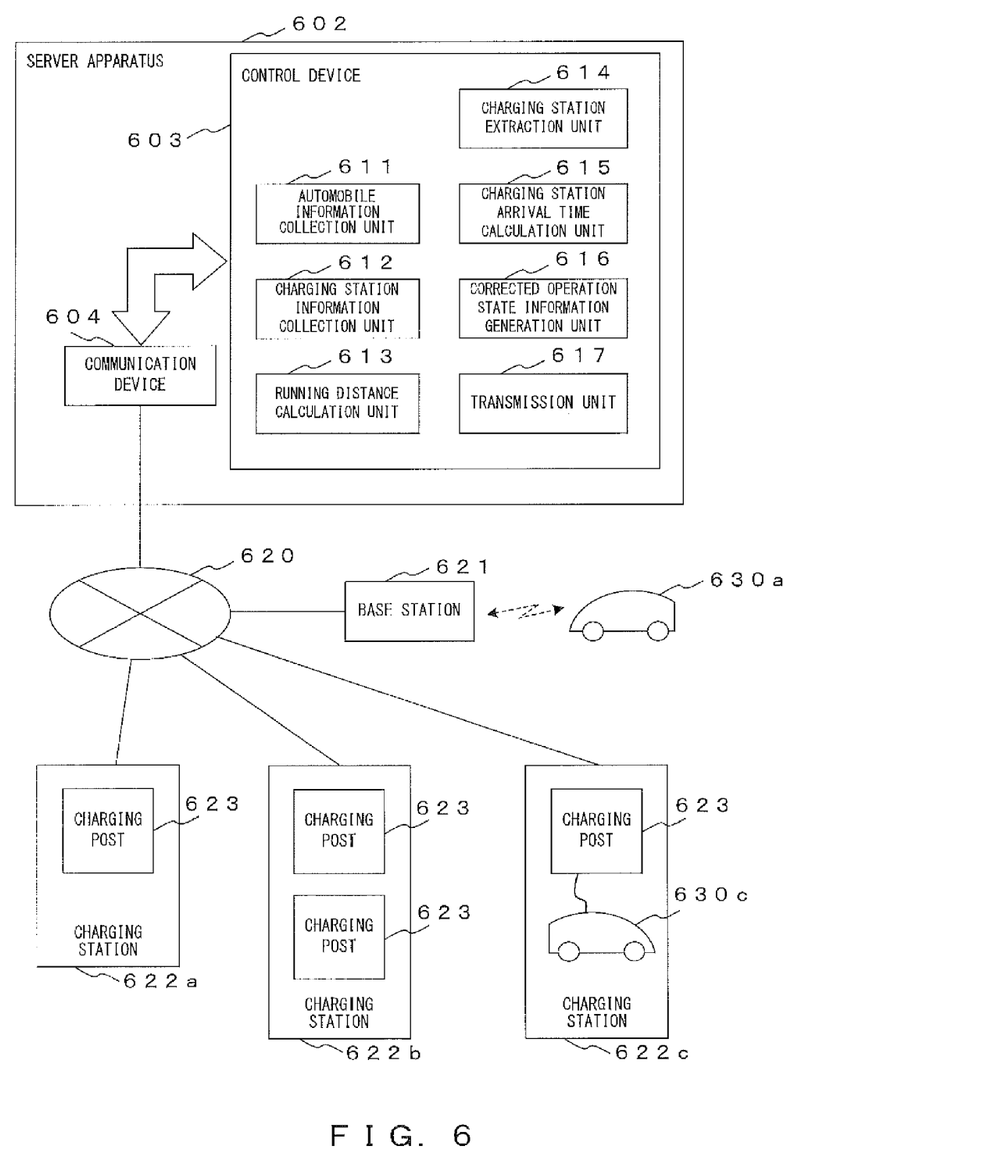
FIG. 6 shows an important portion of a guidance system that provides guidance of an available battery charger.

Also, Patent Document 2 and other documents describe a guidance system that reports to a server apparatus etc. the usage state of a battery charger of an electric automobile that runs by using a battery, and provides the driver of the electric automobile with guidance about an available battery charger. An important portion of this system is shown in FIG. 6. As shown in FIG. 6, a server apparatus 602 of the guidance system includes a control device 603 and a communication device 604.

The control device 603 includes an automobile information collection unit 611, a charging station information collection unit 612, a running distance calculation unit 613, a charging station extraction unit 614, a charging station arrival time calculation unit 615, a corrected operation state information generation unit 616 and a transmission unit 617.

The automobile information collection unit 611 receives running information including the position information of an electric automobile 630a and the state of the battery via a base station 621, a communication network 620 and a communication device 604. The charging station information collection unit 612 receives operation information representing the operation state from respective charging stations 622a, 622b and 622c via the communication network 620 and the communication device 604. This operation information includes, among others, information related to whether or not each of the charging stations 622a through 622c is open, information related to vacancy of charging spaces of charging posts 623, and charging information of an electric automobile 630c that is being charged such as charging completion expected time information.

The running distance calculation unit 613 calculates a remaining runnable distance on the basis of the velocity information and the temporal change of the battery information of the electric automobile 630a. The charging station extraction unit 614 extracts one of the charging stations 622a through 622c that are distributed over the scope of the remaining runnable distance, on the basis of the position information of the electric automobile 630a.

The charging station arrival time calculation unit 615 generates a piece of arrival time information, which is the time at which the electric automobile 630a will arrive at the charging stations 622a through 622c for each of the charging stations 622. The corrected operation state information generation unit 616 generates corrected operation state information, which is the operation state at a time later by a prescribed period of time, on the basis of the operation information of the charging stations 622a through 622c.

The transmission unit 617 reports the arrival time information and the corrected operation state information of the arrival time for each of the charging stations 622a through 622c to the driver of the electric automobile 630a via the communication network 620 and the base station 621, and provides the driver with guidance of the nearest available charging station.

PRIOR ART DOCUMENT

Patent Document

[Patent Document 1] Japanese Laid-open Patent Publication No. 2005-139000
[Patent Document 2] Japanese Laid-open Patent Publication No. 2011-102739

SUMMARY

Problems to be Solved by the Invention

Figure 7:
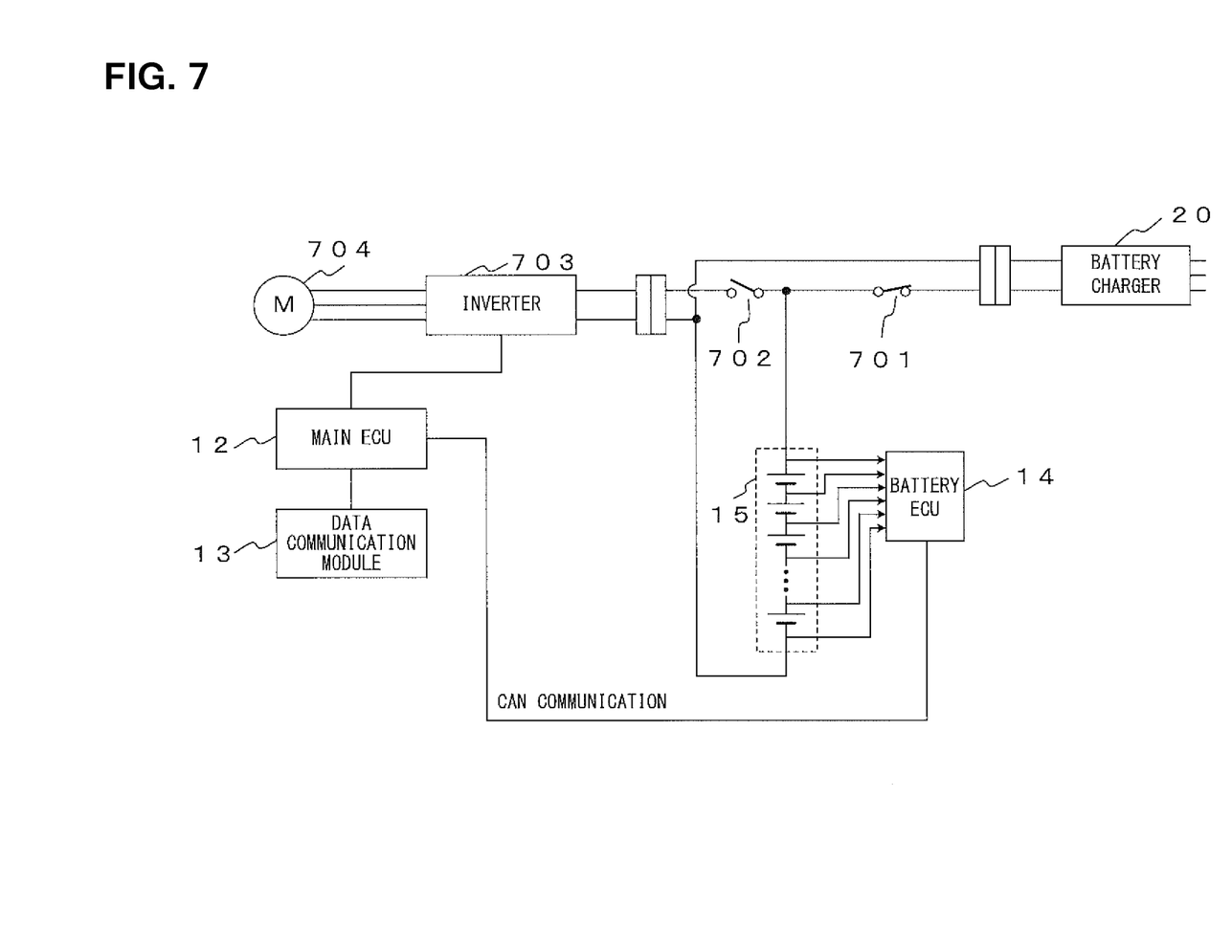
FIG. 7 shows charging of a battery of a vehicle by using a battery charger.

FIG. 7 shows a situation where a battery of a vehicle such as a forklift etc. is charged by using a battery charger. As shown in FIG. 7, the electric power from a battery 15 is provided to various loads 704 such as a motor for driving the vehicle etc. via an inverter 703 and is also provided to a main control unit (ECU) 12 for controlling the running and a data communication module 13.

When a battery charger 20 is connected to the battery 15 of such a vehicle as above so that charging is conducted, a relay 701 for the connection to the battery charger 20 is turned on (conducting state) and a relay (or a connector) 702 for providing electric power to the vehicle is turned off (disconnected state) for safety reasons so that the vehicle will not erroneously run during the charging.

Accordingly, in a vehicle that is not provided with a backup battery in addition to the battery 15, which is for the main power source, electric power is not provided to the main control unit (ECU) 12 for controlling the running or the data communication module 13 so that it is not possible to communicate with an external management system during charging, preventing the management system from recognizing the state of the battery 15 or the usage state etc. of the battery charger 20 during charging, which is problematic.

Note that a battery control unit (ECU) 14 for monitoring a battery is provided with electric power from the battery 15, and thus can operate to collect pieces of monitoring information by monitoring the state of the battery 15 that is being charged even when the battery control unit (ECU) 14 is being charged.

Even with a management system that manages the operation state of an industrial vehicle shown in FIG. 5, it is not possible to transmit the operation state of a vehicle to the management system via the data communication module 511 in the vehicle 500 during the charging. Also, although the charging stations 622a through 622c in the guidance system shown in FIG. 6 transmit information related to the charging post 623 to the charging station information collection unit 612 of the server apparatus 602, information related to a battery being charged is not transmitted and the server apparatus 602 does not manage the battery or the battery charger.

In view of the above, the present invention provides a management system and a management method of a battery and a battery charger that make it possible for a remote management system to obtain information on the states of batteries and information on the usage states of battery chargers and to manage respective batteries and respective battery chargers collectively in the remote management system even during the charging.

Means for Solving the Problems

A management system of a battery and a battery charger according to an aspect for solving the above problem is a management system, connected to a battery charger for charging a battery via a communication network, of a battery and a battery charger, the management system including a storage unit configured to receive communication data containing information on a state of the battery and information on a usage state of the battery charger from a communication unit provided in the battery charger via the communication network, and configured to store the information on the state of the battery and the information on the usage state of the battery charger contained in the communication data in association with time information for each of the batteries and each of the battery chargers, and a unit configured to process the information stored in the storage unit as statistic data and to display the processed statistic data.

A battery charger according to another aspect for solving the above problem is a battery charger that charges a battery, the battery charger including a charge control unit configured to send information on a state of the battery and information on a usage state of the battery charger to a communication unit, and a communication unit configured to transmit, to a management system via a communication network, the information on the state of the battery and the information on the usage state of the battery charger sent from the charge control unit.

Effect of the Invention

According to the present invention, a communication unit (ECU) is provided to a battery charger, and by obtaining information on the state of a battery and information on the usage state of a battery charger by using the management system via a communication network from the communication unit (ECU), it is possible for a remote management system to obtain information on the state of the battery and information on the usage state of the battery charger even during the charging.

PREFERRED EMBODIMENTS

Figure 1:
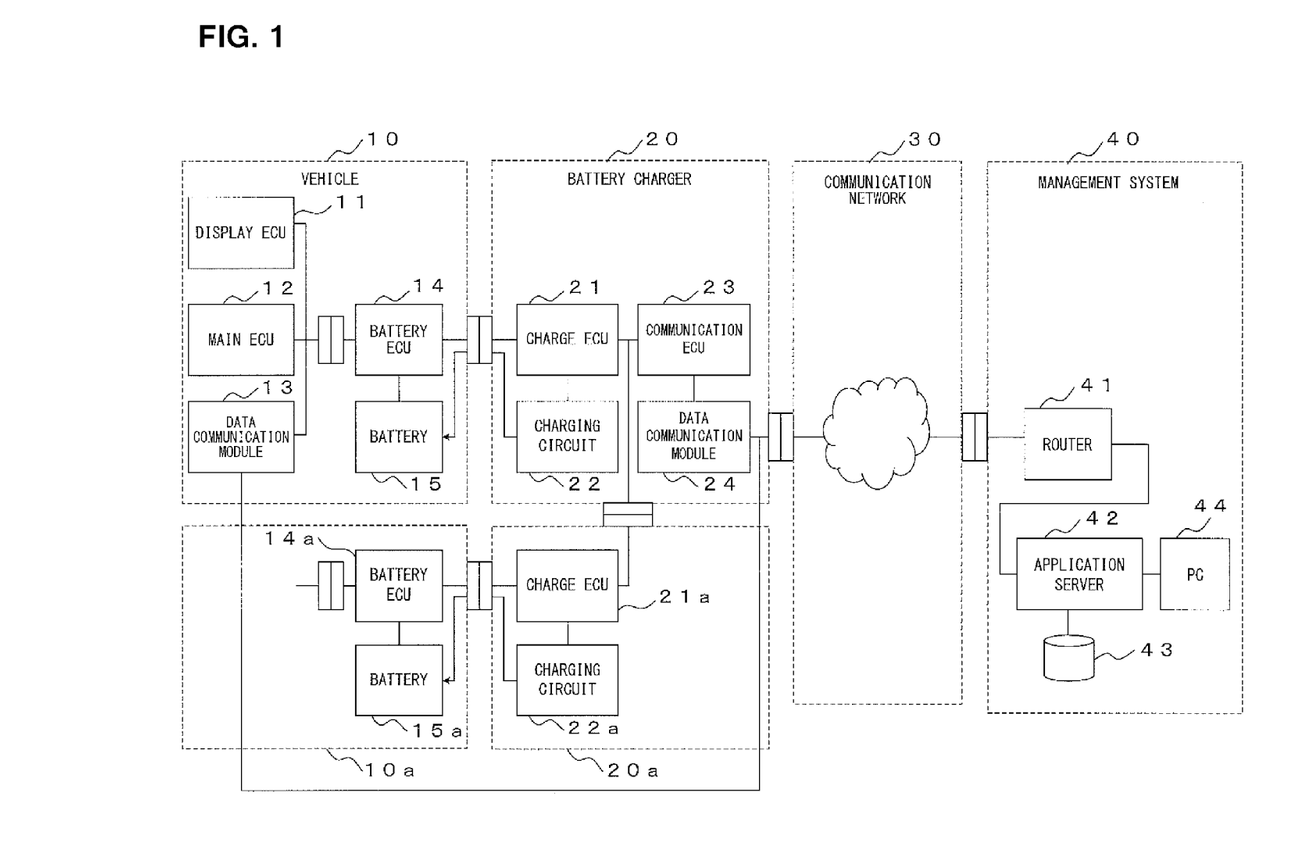
FIG. 1 shows a configuration example of a management system of a battery and a battery charger according to the present embodiment.

Explanations will be given for a management system of a battery and a battery charger and for a battery charger by referring to the drawings. FIG. 1 shows a configuration example of a management system of a battery and a battery charger according to the present embodiment. In FIG. 1, 10 denotes a vehicle driven by a battery such as a forklift, 20 denotes a battery charger, 30 denotes a communication network such as the Internet and 40 denotes a management system.

The vehicle 10 includes a display control unit (ECU: Electronic Control Unit) 11, a main control unit (ECU) 12, the data communication module 13, the battery control unit (ECU) 14 and the battery 15.

The display control unit (ECU) 11 is a control unit that controls a display device (not shown) for displaying information such as various states of the vehicle 10, the guidance, etc. for the driver of the vehicle 10. The main control unit (ECU) 12 controls an electric motor (not shown) and an inverter (not shown) in the vehicle 10 so as to mainly control the running etc. of the vehicle 10.

The data communication module 13 transmits, to the management system 40 via the communication network 30, information on the operation state etc. of the vehicle body detected by various sensors (not shown). The battery control unit (ECU) 14 is a control unit that monitors battery states such as the voltage, the current, the temperature, the charge states, etc. of the battery 15 so as to conduct control so that the battery 15 is maintained in an appropriate state.

The battery 15 may be a rechargeable battery such as a lithium-ion battery etc., or may be an assembled battery made by assembling a plurality of cells in parallel or in series such as connecting cells in parallel or in series, or by further connecting series-connected electrical cells in parallel or connecting parallel-connected cells in series. The battery 15 is implemented in the battery pack (not shown) together with the battery control unit (ECU) 14.

The battery charger 20 includes a charge control unit (ECU) 21, a charging circuit 22, a communication unit (ECU) 23 and a data communication module 24. The charge control unit (ECU) 21 is connected to the battery control unit (ECU) 14 via a connector, and receives state information of the battery 15 from the battery control unit (ECU) 14 so as to control the charging operation of the charging circuit 22 on the basis of the state information of the battery 15.

Also, the charge control unit (ECU) 21 is connected to the communication unit (ECU) 23 so as to send the information on the usage state of the battery charger 20 and the information on the state of the battery 15 to the communication unit (ECU) 23 and control the charging circuit 22 on the basis of control information from the management system 40 input through the communication unit (ECU) 23. The charging circuit 22 is connected to the battery 15 via a connector and charges the battery 15 in accordance with the control conducted by the charge control unit (ECU) 21.

The communication unit (ECU) 23 sends, to the data communication module 24, information on the state of the battery 15 and the usage states of the battery chargers 20a and 20b sent from the charge control unit (ECU) 21, and also sends, to the charge control unit (ECU) 21, control information from the management system 40 input through the data communication module 24.

The data communication module 24 transmits, to the management system 40 via the communication network 30, information on the state of the battery 15 and the usage information of the battery charger 20 sent from the communication unit (ECU) 23, and also sends, to the communication unit (ECU) 23, control information received from the management system 40 via the communication network 30.

It is also possible to employ a configuration in which a plurality of the battery chargers 20 are provided at one site of a factory etc., one of the battery chargers 20 is configured to be connected to a different second battery charger 20a via a connector, the battery charger 20a includes a charge control unit (ECU) 21a and a charging circuit 22a, and the charge control unit (ECU) 21a is connected to the communication unit (ECU) 23 in the first battery charger 20 via a connector.

In the above configuration, the charge control unit (ECU) 21a of the second battery charger 20a receives information on the state of a battery 15a of a second vehicle 10a from a battery control unit (ECU) 14a of the second vehicle 10a via a connector, and sends the information on the battery 15a and the usage information of the battery charger 20a to the communication unit (ECU) 23 of the battery charger 20 via a connector. The charge control unit (ECU) 21a also controls a charging circuit 22a in accordance with control information from the management system 40 input through the communication unit (ECU) 23 of the battery charger 20.

As described above, by making communications possible between the battery chargers 20 and 20a, it is possible for a plurality of the battery chargers 20 provided at one site of a factory etc. to share the communication unit (ECU) 23 and the data communication module 24 provided in one of the battery chargers 20, to minimize the number of the communication units (ECU) 23 and the data communication modules 24 to be provided, and to utilize the communication services of the communication network 30 at low cost.

Communications in the vehicle 10 and in the battery charger 20, communications between the vehicle 10 and the battery charger 20, and communications between the first battery charger 20 and the battery charger 20a can be realized by for example CAN (Controller Area Network) communications. CAN communications are designed while taking higher tolerance to noise into consideration, and are used for data transfer between devices that are connected to each other.

The communication network 30 is a communication network through which communication services are provided by Internet service providers etc. Accesses to the communication network 30 may be accesses based on wireless communications such as WCDMA (registered trademark), GSM (registered trademark), etc., wired communications such as Digital Subscriber Line, optical line, etc.

Communication data from the data communication module 24 is transmitted to the management system 40 via the communication network 30. A router 41 of the management system 40 receives communication data from the communication network 30, and sends the communication data to an application server 42 by referring to the destination address of the communication data. The application server 42 is a server that manages information on the state of a battery of each vehicle and the usage state of each battery charger collectively. The application server 42 stores, in a database of a storage device 43, information on a state of a battery being charged and information on the usage state of a battery charger contained in the received communication data in association with time information for each battery and each battery charger, processes the result as statistic data in association with time information for each battery and each battery charger, and sends the processed statistical data to a personal computer 44 of the management terminal so that the personal computer 44 displays the data.

As described above, by adding a communication function to the battery charger 20 and transmitting information on the usage state of the battery charger 20 and information on the state of the battery 15 of the vehicle 10 to the management system 40, the management system 40 can obtain information on the state of each of the batteries 15 for each of the vehicles 10 and information on the usage state for each of the battery chargers 20, and manage them collectively.

The management system 40 utilizes the function of communicating with the battery charger 20 and also utilizing information obtained by the function, and thereby can conduct fleet management such as for example (1) through (5) below collectively.

(1) Operation management of battery charger
(2) Charging power management of battery charger
(3) Charging power control of battery charger
(4) Remote monitoring of battery
(5) Updating of firmware of battery control unit (ECU) and charge control unit (ECU).

Regarding "(1) Operation management of battery charger" above, the management system 40 provides information on the operation of the battery charger 20 (charge state, charging power, charging elapsed time, etc.) and peripheral information (remaining power of the battery 15, operable period of time, etc.). (a) in FIG. 2 shows an example of information provided in the operation management of the battery charger 20.

Figure 2:
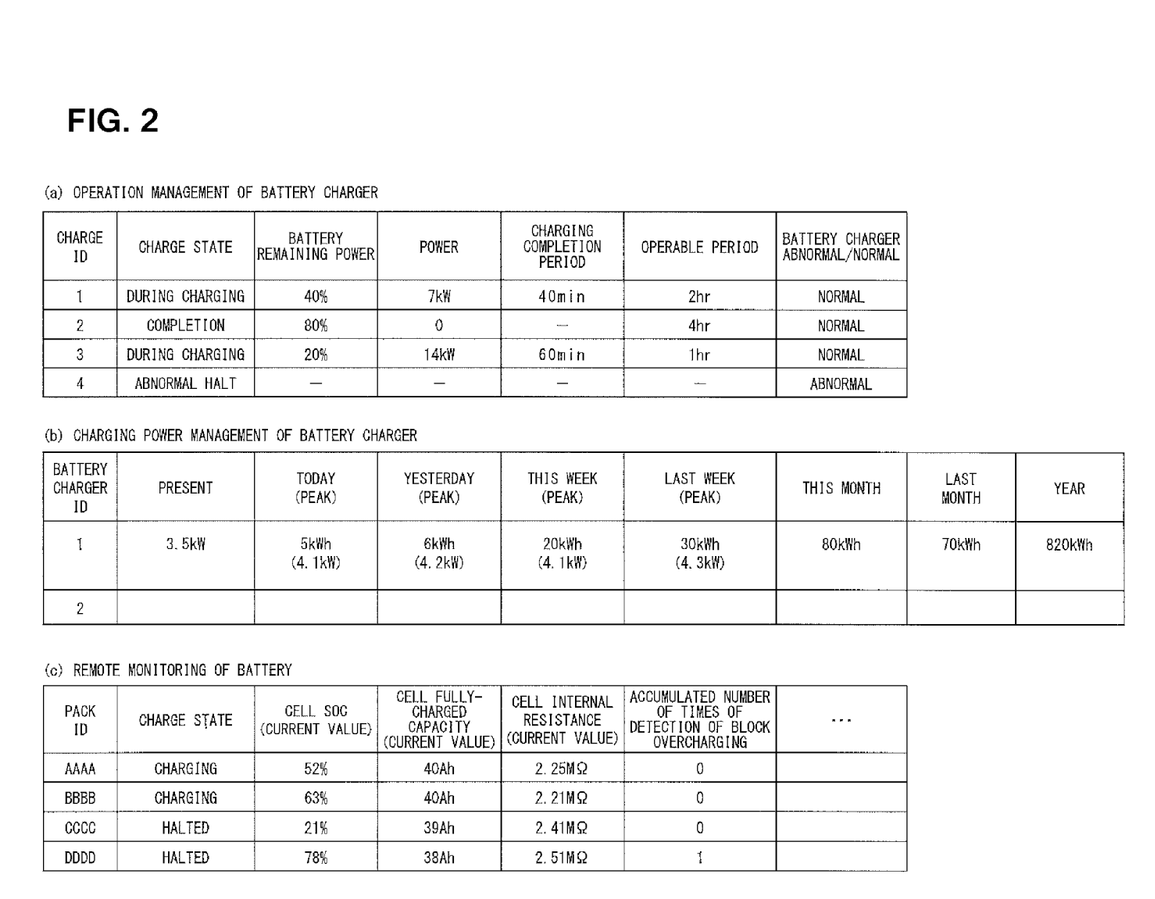
FIG. 2 shows an example of management of operations of a battery charger, management of charging power of a battery charger and remote monitoring of a battery.

The example of the operation management of the battery charger 20 shown in (a) in FIG. 2 shows that, regarding the battery charger with charge ID "1", the charge state is "during charging", the remaining power of the battery being charged is 40%, the charging power is 7 kW, the charging completion period of time is 40 minutes, the operable period of time of the battery at the current moment is 2 hours, and the battery charger is in a normal state.

Regarding the battery charger with charge ID "2", it is shown that the charge state is "completion", the remaining power of the battery being charged is 80%, the charging power is 0 kW, the charging completion period of time is "–", which represents the completion of the charging, the operable period of time of the battery at the current moment is 4 hours, and the battery charger is in a normal state.

Regarding the battery charger with charge ID "3", it is shown that the charge state is "during charging", the remaining power of the battery being charged is 20%, the charging power is 14 kW, the charging completion period of time is 60 minutes, the operable period of time of the battery at the current moment is 1 hour, and the battery charger is in a normal state.

Regarding the battery charger with charge ID "4", it is shown that the charge state is "abnormal halt", the remaining power of the battery being charged, the charging power and the operable period of time of the battery at the current moment are unknown, and the battery charger is in an abnormal state.

On the basis of these pieces of information, the management system 40 can recognize the operation of the battery charger 20 and can determine an efficient timing for charging so that the vehicle 10 such as a forklift etc. is operated efficiently. As an efficient timing for charging, it is possible to charge preferentially a vehicle 10 that is highly likely to fall below the level that is necessary for the minimum operation and to charge preferentially a vehicle 10 that will reach the fully-charged level earlier than other such vehicles 10.

As described above, it is possible to select and charge the charge-target vehicle 10 in an appropriate order and at an appropriate timing so as to operate the vehicles 10 efficiently. Note that it is also possible to change the priority order dynamically when a different vehicle is newly connected to a battery charger during the charging of a vehicle.

Regarding "(2) Charging power management of battery charger" above, the management system 40 provides information on the charging power of the battery charger 20 (moment, time, day, week, month, year, etc.). (b) in FIG. 2 shows an example of the charge management of the battery charger 20.

In the example of charge management of the battery charger 20 shown in (b) in FIG. 2, regarding the battery charger with charge ID "1", the charging power at the present (moment) is 3.5 kW, the accumulated charging power of today is 5 kWh, the peak power of today is 4.1 kW, the accumulated charging power of yesterday is 6 kWh, the peak power of yesterday is 4.2 kW, the accumulated charging power of this week is 20 kWh, the peak power of the this week is 4.1 kW, the accumulated charging power of the last week is 30 kWh, the peak power of the last week is 4.3 kW, the accumulated charging power of the this month is 80 kWh, the accumulated charging power of the last month is 70 kWh and the accumulated charging power of the year is 820 kWh.

With these pieces of charging power information, the charging power of each of the battery chargers 20 can be recognized in the management system 40, can be used for the generation of an electricity expense report regarding the charging power, and can be utilized for an environment management system of ISO14000 (international standard regarding an environment management system issued by ISO). Further, it is also possible to integrate these pieces of charging power information into a Factory Energy Management System (FEMS) so as to construct a Factory Energy Management System (FEMS) including charging power of each of the battery chargers 20.

Explanations will be given for "(3) Charging power control of battery charger". When a plurality of the battery chargers 20, 20a, . . . are used at one site of a factory etc., a configuration is employed in which the personal computer 44 of a management terminal of the management system 40 can control the battery chargers 20, 20a, . . . by limiting their charging power. Thereby, it is possible to reduce the entirety of the power peak of the plurality of the battery chargers 20, 20a, . . . used at one site.

Regarding "(4) Remote monitoring of battery", a configuration is employed in which the personal computer 44 of the management terminal of the management system 40 can monitor the usage data of the battery 15 and the battery 15a remotely. Thereby, the personal computer 44 of the management terminal of the management system 40 can recognize an abnormal state, a deterioration state, etc. of the batteries 15 and 15a and can also recognize a timing for replacing the batteries 15 and 15a so that the secondary use of the batteries 15 and 15a is possible.

(c) in FIG. 2 shows an example of remote monitoring of a battery. The example of remote monitoring of a battery shown in (c) in FIG. 2 shows that, regarding the battery with pack ID "AAAA", the charge state is "during charging", the current measured value of the state of charge (SOC), which is the ratio of the remaining capacity to the fully-charged capacity, is 52%, the current measured value of the fully-charged capacity of the battery is 40 Ah, the current measured value of the internal resistance of the battery is 2.25 MΩ, and the accumulated number of times of detection of overcharging of the battery block is zero.

It is indicated that, regarding the battery of pack ID "BBBB", the charge state is "during charging", the current measurement value of the state of charge (SOC) is 63%, the current measurement value of the fully-charged capacity of the battery is 40 Ah, the current measurement value of the internal resistance of the battery is 2.21 MΩ, and the accumulated number of times of detection of overcharging of the battery block is zero.

It is shown that, regarding the battery with pack ID "CCCC", the charge state is "charging halted", the current measured value of the state of charge (SOC) is 21%, the current measured value of the fully-charged capacity of the battery is 39 Ah, the current measured value of the internal resistance of the battery is 2.41 MΩ, and the accumulated number of times of detection of overcharging of the battery block is zero.

It is shown that, regarding the battery with pack ID "DDDD", the charge state is "charging halted", the current measured value of the state of charge (SOC) is 78%, the current measured value of the fully charged capacity of the battery is 38 Ah, the current measured value of the internal resistance of the battery is 2.51 MΩ, and the accumulated number of times of detection of overcharging of the battery block is one.

The management system 40 associates these pieces of information on the battery with time information, processes the result as statistic data, and sends the processed statistic data to the personal computer 44 of the management terminal, and the personal computer 44 displays these pieces of data.

Explanations will be given for the "(5) Updating of firmware". A configuration is employed in which the personal computer 44 of the management terminal of the management system 40 can update software that executes various processes in the charge control unit (ECU) 21 and 21a and the communication unit (ECU) 23 in the battery chargers 20 and 20a, the battery control units (ECU) 14 and 14a in the battery pack containing the batteries 15 and 15a, etc. (updating of a program).

Thereby, it is possible for the management system 40 to update software such as the charge control unit (ECU) 21 and 21a, the communication unit (ECU) 23, the battery control units (ECU) 14 and 14a, etc. collectively.

Figure 3:
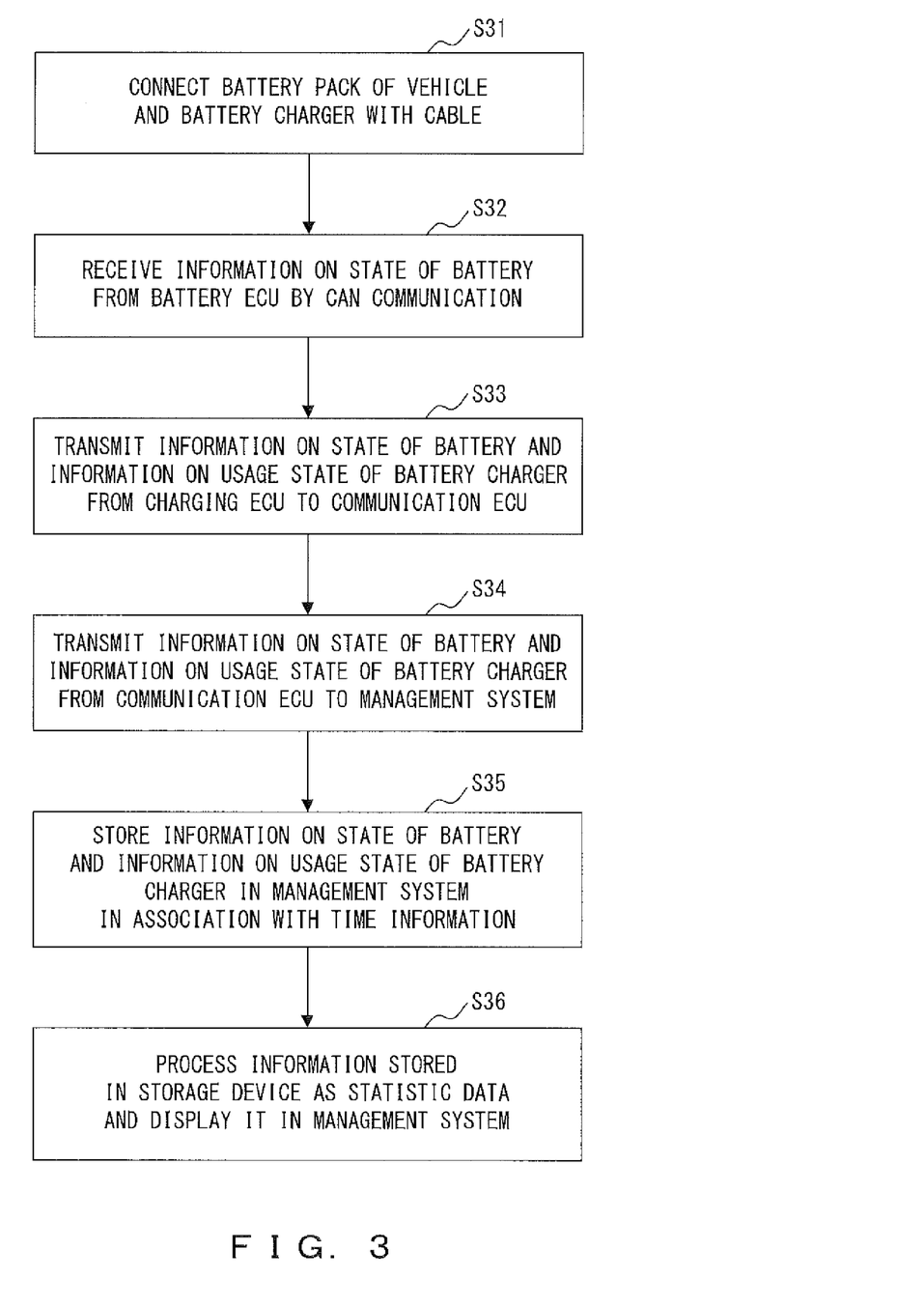
FIG. 3 shows an example of a first flow of a management method of a battery and a battery charger according to the present embodiment.
Figure 4:
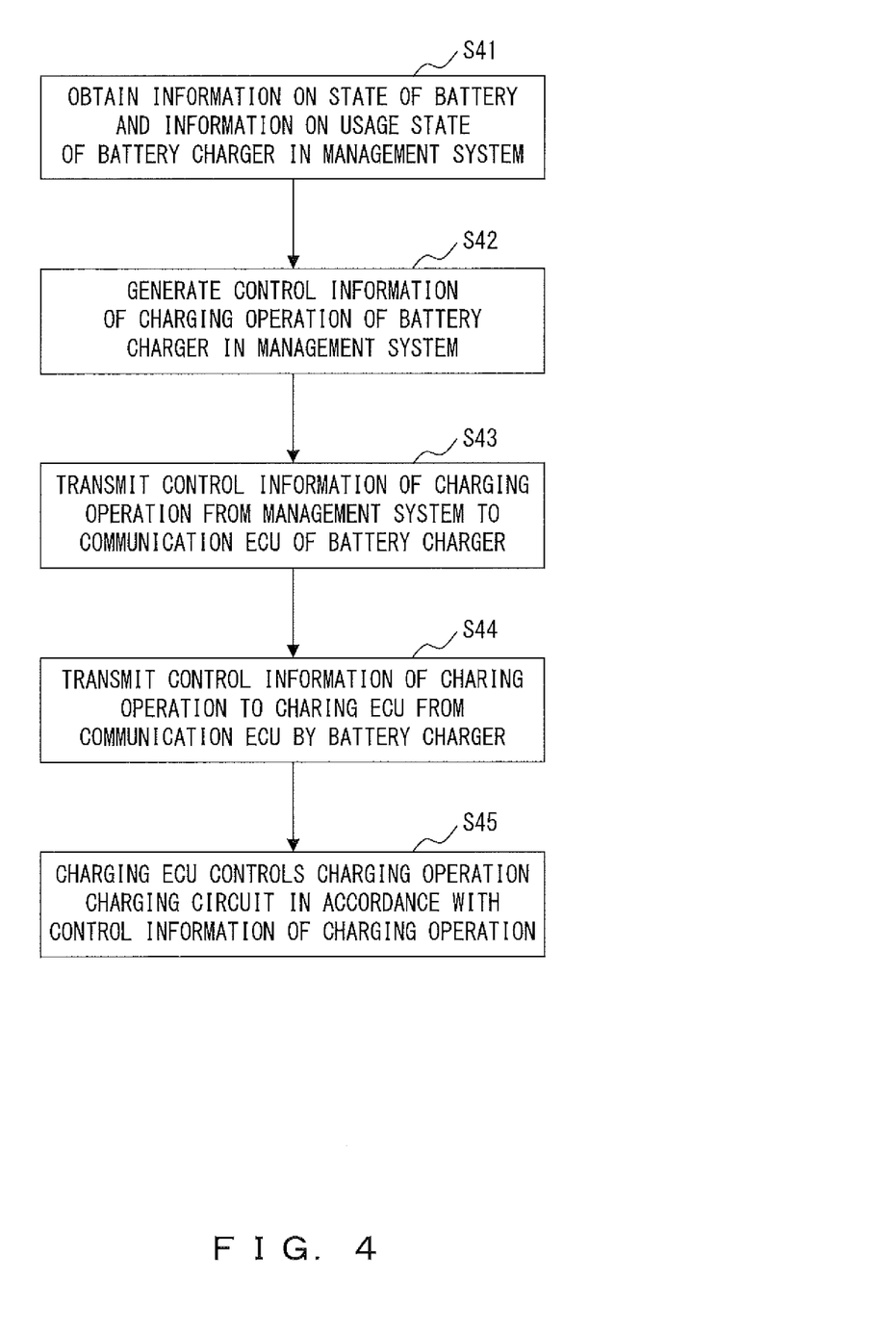
FIG. 4 shows an example of a second flow of the management method of a battery and a battery charger according to the present embodiment.

FIG. 3 and FIG. 4 show examples of flows of a management method of a battery and a battery charger according to the present embodiment. FIG. 3 shows an example of a first flow. When the battery pack of the vehicle 10 and the battery charger 20 are connected with a cable in order to charge the battery 15 of the vehicle 10 (step S31), information on the state of the battery 15 in the battery pack of the vehicle 10 monitored by the battery control unit (ECU) 14 is obtained by using the charge control unit (ECU) 21 of the battery charger 20 from the battery control unit (ECU) 14 by means of CAN communication.

The charge control unit (ECU) 21 transmits information on the state of the battery 15 and the information on the usage state of the battery charger 20 to the communication unit (ECU) 23 included in the battery charger 20 (step S33). The communication unit (ECU) 23 transmits communication data containing information on the state of the battery 15 and information on the usage state of the battery charger 20 to the management system 40 via the data communication module 24 and the communication network 30 (step S34).

The management system 40 receives communication data from the communication unit (ECU) 23 of the battery charger 20 via the communication network 30, and stores, in the storage device 43, the information on the state of the battery 15 and information on the usage state of the battery charger 20 included in the communication data in association with time information for each of the batteries 15 and the battery chargers 20 (step S35).

The application server 42 in the management system 40 or the personal computer 44 of the management terminal processes information stored in the storage device 43 as statistical data, and displays the processed statistical data (step S36).

FIG. 4 shows an example of the second flow. After obtaining information on the state of the battery 15 and the information on the usage state of the battery charger 20 (step S41) by following the first flow in FIG. 3, the management system 40 analyzes the obtained information and generates control information of charging operations such as control of charging power etc. for the battery charger 20 (step S42).

The management system 40 transmits control information of charging operations to the communication unit (ECU) 23 of the battery charger 20 via the communication network 30 and the data communication module 24 (step S43). Receiving control information from the management system 40, the communication unit (ECU) 23 transmits the received control information to the charge control unit (ECU) 21 (step S44).

In accordance with control information sent from the communication unit (ECU) 23, the charge control unit (ECU) 21 controls the charging circuit 22 and controls the operation of charging such as charging power etc. for the battery 15 (step S45).

While explanations have been given for the embodiments of the present invention, the present invention is not limited to the embodiments described above, and various configurations or embodiments are possible without departing from the spirit of the present invention.

EXPLANATION OF SYMBOLS 10,10a vehicle
11 display control unit (ECU)
12 main control unit (ECU)
13 data communication module
14,14a battery control unit (ECU)
15,15a battery
20,20a battery charger
21,21a charge control unit (ECU)
22,22a charging circuit
23 communication unit (ECU)
24 data communication module
30 communication network
31 RADIUS server
32 database
40 management system
41 router
42 application server
43 storage device
44 personal computer

The invention claimed is:

1. A management system of a battery and a battery charger connected to a first battery charger via a communication network from among the first battery charger and a second battery charger, the first battery charger being provided outside a first vehicle, the second battery charger being provided outside a second vehicle, wherein
the first vehicle includes a first battery connected to the first battery charger, and a first battery control unit that controls charging of the first battery and that monitors a state of the first battery,
the first battery charger includes a first charge control unit that is connected to the first battery control unit via a connector and that communicates with the first battery control unit, and a communication unit that is connected to the first charge control unit and that communicates with the management system via the communication network,
the second vehicle includes a second battery connected to the second battery charger, and a second battery control unit that controls charging of the second battery and that monitors a state of the second battery,
the second battery charger does not include a communication unit that communicates with the management system via the communication network, and includes a second charge control unit that is connected to the second battery control unit via a connector and that communicates with the second battery control unit,
the first charge control unit transmits, to the communication unit, information on the state of the first battery received from the first battery control unit and information on a usage state of the first battery charger,
the second charge control unit transmits, to the communication unit, information on the state of the second battery received from the second battery control unit and information on a usage state of the second battery charger, and
the management system receives, via the communication network, the information on the state of the first battery, the information on the state of the second battery, the information on the usage state of the first battery charger, and the information on the usage state of the second battery charger, all of which are transmitted from the communication unit.

2. The management system of the battery and the battery charger according to claim 1, the management system comprising:
   a management terminal configured to transmit first control information and second control information to the communication unit of the first battery charger via the communication network, the first control information being for controlling an operation of charging of the first battery conducted by the first battery charger, the second control information being for controlling an operation of charging of the second battery conducted by the second battery charger, wherein
   the communication unit sends, to the first charge control unit, the first control information transmitted from the management terminal and received via the communication network, and sends the second control information received via the communication network to the second charge control unit,
   the first charge control unit controls the operation of charging of the first battery in accordance with the first control information, and
   the second charge control unit controls the operation of charging of the second battery in accordance with the second control information.

3. The management system of the battery and the battery charger according to claim 1, wherein
   the information on the usage states of the first and second battery chargers includes an identification number of the battery charger, a charge state, a charging power of the battery charger, and a charging elapsed time, the charge state indicating whether the battery charger is currently charging, whether the battery charger has completed charging, or whether the battery charger has been halted due to an abnormality.

4. The management system of the battery and the battery charger according to claim 1, wherein
   the information on the states of the first and second batteries includes an identification number of the battery, a charge state, a state of charge of the battery, a fully-charged capacity of the battery, an internal resistance of the battery, and the accumulated number of times of detection of overcharging of the battery, the charge state indicating whether the battery is being currently charged or whether charging of the battery has been halted.

5. The management system of the battery and the battery charger according to claim 1, the management system comprising:
   a storage unit configured to receive communication data containing information on states of the first and second batteries and information on usage states of the first and second battery chargers from the communication unit provided in the first battery charger via the communication network, to store the information on the states of the first and second batteries contained in the communication data in association with time information for each of the batteries, and to store the information on the usage states of the first and second battery chargers in association with time information for each of the battery chargers; and
   a unit configured to process the information stored in the storage unit as statistic data for each of the batteries, to process the information stored in the storage unit for each of the battery chargers as statistic data, and to display the processed statistic data.

6. A management method of a battery and a battery charger in a management system connected to a first battery charger via a communication network from among the first battery charger and a second battery charger, the first battery charger being provided outside a first vehicle, the second battery charger being provided outside a second vehicle wherein
   the first vehicle includes a first battery connected to the first battery charger, and a first battery control unit that controls charging of the first battery and that monitors a state of the first battery,
   the first battery charger includes a first charge control unit that is connected to the first battery control unit via a connector and that communicates with the first battery control unit, and a communication unit that is connected to the first charge control unit and that communicates with the management system via the communication network,
   the second vehicle includes a second battery connected to the second battery charger, and a second battery control unit that controls charging of the second battery and that monitors a state of the second battery,
   the second battery charger does not include a communication unit that communicates with the management system via the communication network, and includes a second charge control unit that is connected to the second battery control unit via a connector and that communicates with the second battery control unit, and
   the management method comprises:
   transmitting, by the first charge control unit and to the communication unit, information on the state of the first battery received from the first battery control unit and information on a usage state of the first battery charger;
   transmitting, by the second charge control unit and to the communication unit, information on the state of the second battery received from the second battery control unit and information on a usage state of the second battery charger; and
   receiving, by the communication unit, the information on the state of the first battery, the information on the state of the second battery, the information on the usage state of the first battery charger, and the information on the usage state of the second battery charger, and transmitting, by the communication unit, the received information to the management system via the communication network.

7. The management method of the battery and the battery charger according to claim 6, wherein
   the management system includes a management terminal configured to transmit first control information and second control information to the communication unit of the first battery charger via the communication network, the first control information being for controlling an operation of charging of the first battery conducted by the first battery charger, the second control information being for controlling an operation of charging of the second battery conducted by the second battery charger,
   the communication unit sends, to the first charge control unit, the first control information transmitted from the management terminal and received via the communication network, and sends the second control information received via the communication network to the second charge control unit, the first charge control unit controls the operation of charging of the first battery in accordance with the first control information, and the second charge control unit controls the operation of charging of the second battery in accordance with the second control information.

8. The management method of the battery and the battery charger according to claim 6, wherein the information on the usage states of the first and second battery chargers includes an identification number of the battery charger, a charge state, a charging power of the battery charger, and a charging elapsed time, the charge state indicating whether the battery charger is currently charging, whether the battery charger has completed charging, or whether the battery charger has been halted due to an abnormality.

9. The management method of the battery and the battery charger according to claim 6, wherein the information on the states of the first and second batteries includes an identification number of the battery, a charge state, a state of charge of the battery, a fully-charged capacity of the battery, an internal resistance of the battery, and the accumulated number of times of detection of overcharging of the battery, the charge state indicating whether the battery is being currently charged or whether the charging of the battery has been halted.

10. The management method of the battery and the battery charger according to claim 6, the management method comprising:

receiving communication data containing information on states of the first and second batteries and information on usage states of the first and second battery chargers from the communication unit provided in the first battery charger via the communication network, storing the information on the states of the first and second batteries contained in the communication data in association with time information for each of the batteries, and storing, in a storage unit, the information on the usage states of the first and second battery chargers in association with time information for each of the battery chargers; and processing the information stored in the storage unit as statistic data for each of the batteries, processing the information stored in the storage unit for each of the battery chargers as statistic data, and displaying the processed statistic data.

* * * * *